Nov. 1, 1949.                E. M. OTTO                2,486,432
              CONDUCTIVITY CELL FOR VISCOUS MATERIALS
                          Filed July 7, 1948
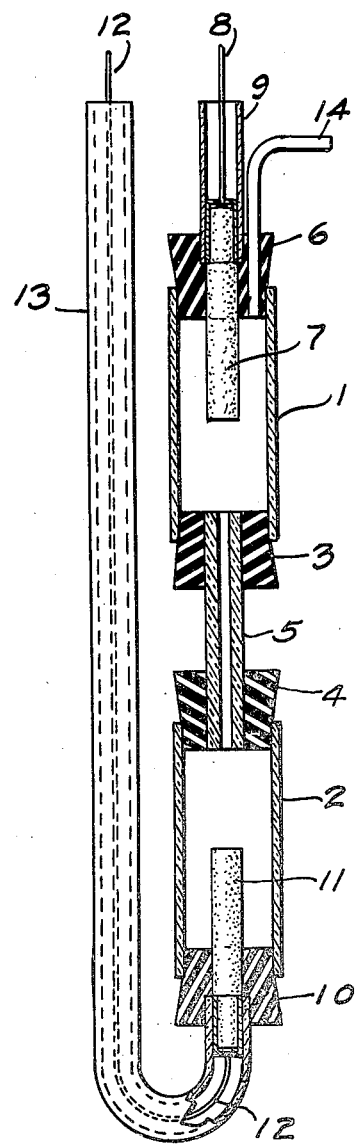
INVENTOR
EARL M. OTTO
BY
ATTORNEY Patented Nov. 1, 1949

2,486,432

UNITED STATES PATENT OFFICE 2,486,432

CONDUCTIVITY CELL FOR VISCOUS MATERIALS

Earl M. Otto, Washington, D. C.

Application July 7, 1948, Serial No. 37,336

1 Claim. (Cl. 175—183)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention relates to a conductivity cell for the determination of the resistivity of viscous materials.

Heretofore, the determination of the resistivity of pastes, gels, and other viscous materials has been an impossible procedure since the design of commercial conductivity cells is such that the cells cannot be filled with viscous materials.

Accordingly, it is an object of this invention to provide a conductivity cell suitable for use in determining the resistivity of viscous materials.

These and other advantages hereinafter apparent are accomplished in accordance with this invention, the particular features and advantages of which will be made clear by reference to the accompanying drawing and ensuing description.

By this invention there has been provided an apparatus for the determination of the conductivity of viscous materials comprising two reservoirs, each of said reservoirs enclosing a suitable electrode, and said reservoirs interconnected by means of a constricted tube; and all elements of said apparatus being demountable.

In the accompanying drawing, which forms a part of the specification, there is shown a sectional view of a presently preferred embodiment of the invention suitable for use in determining the conductivity of viscous materials. The drawing shows the various cell components, which are: two reservoirs 1 and 2, which are adapted to receive and be interconnected by stoppers 3 and 4 and a constricted tube 5. Each reservoir is also adapted to receive an electrode assembly. The electrode assembly for reservoir 1 comprises stopper 6, electrode 7, lead wire 8 connecting the cell with the conductivity bridge, which is not shown, and, as in the instant case, since the cell is one designed for immersion in a constant temperature bath wherein electric leakages would be accentuated, it is desirable to provide an adequate means for insulating the external portion of the electrode and the lead wire to the extent of immersion; such as using the impermeable insulating conduit 9. The electrode assecmbly for reservoir 2 is similarly constructed and comprises stopper 10, electrode 11, lead wire 12, and, if required, an impermeable insulating conduit 13. In order to compensate for volume changes of the test material in the cell and to facilitate filling of the cell, reservoir 1 should be provided with an overflow, or vent. This can be accomplished by means such as that shown in the drawing; an overflow 14 passing through stopper 6 into reservoir 1. Throughout this discussion when stoppers are rubber or other compressible material, care should be used in assembling the apparatus so that the total cell volume and the spatial relationships of the cell components remain constant. This can be accomplished without sacrificing demountability by the use of suitable markings or graduations on the various cell components to permit the constancy of cell characteristics on reassembly.

Further in this connection, all stoppers should be securely held in place and all joints should be sufficiently tight to prevent the leakage of the test material out of the cell or the dilution of the test material on immersion in a liquid constant temperature bath. This can be accomplished in many ways—as for example, securing the stoppers with wires or the like.

The size of the cell and the materials of construction for the cell are not to be construed as being limited to the specific materials or dimensions referred to hereinafter, since equivalents and variations will be obvious. In the cell, as shown in the drawing, which is for determining the conductivity of viscous liquids, the reservoirs 1 and 2 are sections of glass tubing about 2.8 cm. I. D. and about 7.0 cm. in length. Stoppers 3, 4, 6, and 10 are rubber, therein constricted tube 5 is 6 mm. I. D. capillary tube; about 7.5 cm. in length. The electrodes 7 and 11 are shortened ordinary oil-impregnated (to prevent absorption of the material being tested) battery carbons (cut to 1 in. x $\tfrac{7}{16}$ in. diameter) to which the circuit connecting wires 8 and 12 are attached in any manner which will give a suitable and secure electrical contact; such as, for example, soldering the wires to a metal collar which can be crimped on or electroplated on the electrode. The electrodes are spaced about 1 to 1½ inches from the constricted tube openings. Noble metal electrodes can be used but are expensive. The overflow 14 is shown as a small bore tube passing through stopper 6, however, the reservoir can also be vented by other means such as a venting tube sealed in the body of the reservoir and of such design as to permit the expansion and contraction of the material being tested without affecting the electrode-electrolyte contact surface area and which will permit completely filling the cell with test material.

A satisfactory way of using this cell for determining the conductivity of viscous materials involves first calibrating the cell at known temperatures to determine the cell constant. This can be done readily by filling the cell with a solution of known conductivity such as a potassium chloride solution, connecting the cell in a suitable conductivity bridge circuit, permitting the cell and content to reach thermal equilibrium in a constant temperature bath, at a known temperature, and then measuring the resistance of the cell. The value so obtained should be corrected by deducting the resistance of the lead wires, especially if it is of any consequential magnitude. The cell constant will be changed if any subsequent departures are made in reassembling the cell so that the electrode test material contact area is altered, the length or cross section of the connecting tube 5 is changed, or the spatial relation of the electrodes and tube is changed. When measuring the resistivity of highly conductive substances it is necessary that the constricted tube 5 have a very narrow inside diameter, otherwise it would be necessary to separate the electrodes by great distances and thereby render the apparatus bulky and impractical for use in connection with other standard laboratory equipment.

When measuring the conductivity of viscous materials the cell can be suitably filled and assembled by first assembling the cell components comprising reservoir 2, stopper 10, electrode 11, wire 12, and insulating conduit 13. The material to be tested is loaded in the reservoir 2. The cell components comprising stopper 4, tube 5, stopper 3, and reservoir 1 are then assembled and stopper 4 of this sub-assembly is then inserted in the proper opening of reservoir 2, thereby displacing some of the test material and forcing it through tube 5 into reservoir 1 so as to fill reservoir 1 partially. Additional test material is then added to fill reservoir 1. Thereafter the cell components comprising stopper 6, electrode 7, wire 8, insulating conduit 9, and the overflow 14 are then assembled and stopper 6 of this sub-assembly is then inserted in the proper opening of reservoir 1, thereby displacing and forcing excess test material, if there be any, through the overflow 14. The filled cell can then be connected to the conductivity bridge circuit and the resistivity determined as previously described in the standardization of the cell. After use, the cell can be readily disassembled and cleaned by obvious methods.

By the use of this cell resistivity data have been obtained on all kinds of dispersion; liquids, pastes, gels, and the like, even though their viscosity is high. Prior to this cell's development, only free flowing liquids could be gotten into commercially available conductivity cells and therefore resistivity data on viscous materials were unobtainable. This cell has been found to be especially suitable for measuring the resistivity of dry cell (battery) pastes, even at very low temperatures.

While in the invention, as particularly shown and described, the cell is so arranged that the reservoirs and constricted tube lie along a straight line; such arrangement is not essential to the operation of the cell but was desirable in order that the cell could be conveniently immersed in a Dewar flask for low constant temperature measurements.

While the invention as particularly shown and described does not provide means for measuring temperatures within the cell itself, such means can be readily incorporated in such cell assembly.

Since many widely differing embodiments of the invention will occur to one skilled in the art, it is not limited to the specific details illustrated or described, and various changes can be made therein without departing from the spirit and scope thereof.

What is claimed is:

An apparatus for the measurement of the conductivity of viscous materials comprising two reservoirs, each of said reservoirs enclosing a suitable electrode, and said reservoirs interconnected by means of a constricted tube; and all elements of said apparatus being demountable.

EARL M. OTTO.

REFERENCES CITED

The following references are of record in the file of this patent:

UNITED STATES PATENTS

| Number | Name | Date |
| --- | --- | --- |
| 2,186,727 | Martin et al. | Jan. 9, 1940 |
| 2,358,163 | Heym | Sept. 12, 1944 |

Certificate of Correction

Patent No. 2,486,432                                                    November 1, 1949

EARL M. OTTO

It is hereby certified that errors appear in the printed specification of the above numbered patent requiring correction as follows:

Column 1, line 50, for "assecmbly" read *assembly*; column 2, line 33, for the reference numeral "77" read *11*;

and that the said Letters Patent should be read with these corrections therein that the same may conform to the record of the case in the Patent Office.

Signed and sealed this 21st day of March, A. D. 1950.

[SEAL]

THOMAS F. MURPHY,
*Assistant Commissioner of Patents.*